R. Murphy.
Rotary Churn.
N° 43,423. Patented Jul. 5, 1864.

Witnesses: Inventor:

UNITED STATES PATENT OFFICE.

ROBERT MURPHY, OF JASPER, NEW YORK.

IMPROVEMENT IN CHURNS.

Specification forming part of Letters Patent No. 43,423, dated July 5, 1864.

*To all whom it may concern:*

Be it known that I, ROBERT MURPHY, of Jasper, in the county of Steuben and State of New York, have invented a new and Improved Churn; and I do hereby declare that the following is a full, clear, and exact description thereof, which will enable any person skilled in the art to make and use the same, reference being had to the accompanying drawings, forming a part of this specification, in which—

Figure 1:
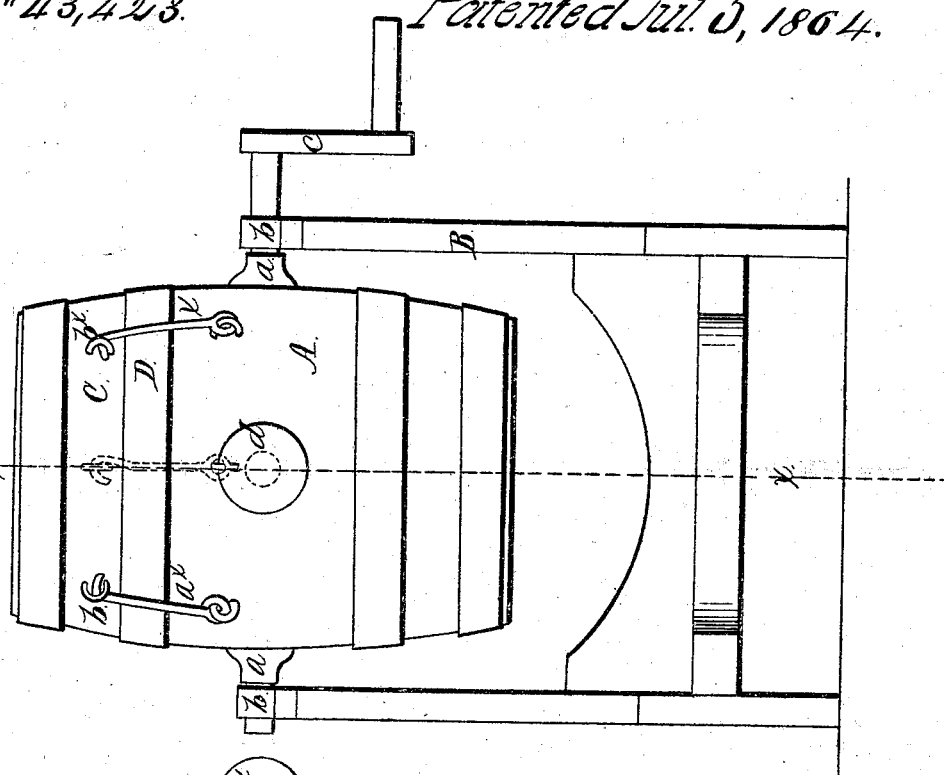
Figure 2:
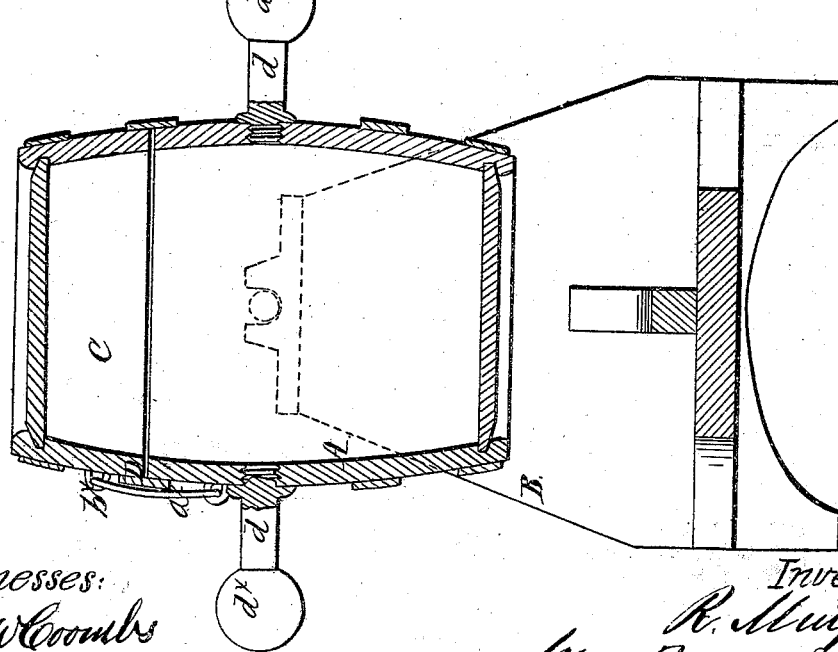

Figure 1 is an external view of my invention; Fig. 2, a vertical central section of my invention, taken in the line $x\ x$, Fig. 1.

Similar letters of reference indicate the same parts.

This invention consists in suspending a barrel-shaped cream receptacle on transverse trunnions in a suitable framing, in combination with the application of weights or counterpoises to the receptacle for the purpose of acting as a fly-wheel, and by their momentum insuring a uniform or steady rotation of the receptacle, as hereinafter described.

A represents a barrel-shaped cream receptacle, provided with a journal or trunnion, $a$, at two opposite points at its center, said journals or trunnions being fitted in bearings $b$ on a framing, B. One of these journals or trunnions $a$ is provided with a crank, $c$, for the purpose of turning the receptacle.

The cream-receptacle is provided with an arm, $d$, at two opposite points, said arms being in a plane at right angles to the plane of the journals or trunnions $a\ a$. These arms have a weight or counterpoise, $d^\times$, at their outer ends, which serve to keep the receptacle in a state of equipoise and insure a steady or uniform rotation of the same by compensating for the elongated shape of the receptacle, as will be plainly understood by referring to Fig. 2.

The receptacle A is divided circumferentially about one-third the distance from one end of it to form a lid, C. This lid is fitted within a hoop, D, which encompasses the receptacle, one-half of the hoop being on the main portion of the receptacle, and the other half encompassing the lid, as shown clearly in Fig. 2. The lid is firmly secured to the body or main portion of the receptacle by means of hooks $a^\times$ and staples $b^\times$, as shown in both figures.

The butter is produced very expeditiously by rotating the receptacle A, the elongated form of the latter, in connection with its revolving movement, producing the necessary agitation of the cream to effect that result.

Having thus described my invention, what I claim as new, and desire to secure by Letters Patent, is—

A barrel churn, A, rotated upon transverse trunnions $a\ a$, and provided with counterpoises $d^\times\ d^\times$, the whole being arranged to operate in the manner and for the purpose set forth.

ROBERT MURPHY.

Witnesses:
NELSON JOHNSON,
N. B. HILBORN.